(12) United States Patent
Guo et al.

(10) Patent No.: US 9,984,604 B2
(45) Date of Patent: May 29, 2018

(54) DISPLAY PANEL, DISPLAY DEVICE AND PIXEL DRIVING METHOD

(71) Applicants: BOE Technology Group Co., Ltd., Beijing (CN); Beijing BOE Optoelectronics Technology Co., Ltd., Beijing (CN)

(72) Inventors: Renwei Guo, Beijing (CN); Xue Dong, Beijing (CN); Ming Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 145 days.

(21) Appl. No.: 15/121,631

(22) PCT Filed: Aug. 18, 2015

(86) PCT No.: PCT/CN2015/087361
§ 371 (c)(1),
(2) Date: Aug. 25, 2016

(87) PCT Pub. No.: WO2016/155202
PCT Pub. Date: Oct. 6, 2016

(65) Prior Publication Data
US 2017/0069237 A1    Mar. 9, 2017

(30) Foreign Application Priority Data
Apr. 2, 2015    (CN) .......................... 2015 1 0154565

(51) Int. Cl.
*G09G 3/00*    (2006.01)
*G09G 3/20*    (2006.01)
(Continued)

(52) U.S. Cl.
CPC ............ *G09G 3/003* (2013.01); *G09G 3/2003* (2013.01); *G09G 5/10* (2013.01); *H04N 13/0404* (2013.01);
(Continued)

(58) Field of Classification Search
CPC ........ G09G 3/003; G09G 3/2003; G09G 5/10; G09G 2300/0452; G09G 2360/147;
(Continued)

(56) References Cited

U.S. PATENT DOCUMENTS 8,421,709 B2    4/2013    Kang
9,167,237 B2    10/2015   Chen et al.
(Continued)

FOREIGN PATENT DOCUMENTS

CN    101820552 A    9/2010
CN    101825773 A    9/2010
(Continued)

OTHER PUBLICATIONS

First Office Action, including Search Report, for Chinese Patent Application No. 201510154565.X, dated Dec. 5, 2016, 11 pages.
(Continued)

*Primary Examiner* — Abhishek Sarma
(74) *Attorney, Agent, or Firm* — Westman, Champlin & Koehler, P.A.

(57) ABSTRACT

A display panel for 3D display is disclosed. It includes a plurality of pixel units arranged in rows and columns, each of the plurality of pixel units including a plurality of sub pixels. The pixel units in adjacent columns are used as left-eye pixel units and right-eye pixel units, respectively, and intermediate sub pixels are provided between the sub pixels of the pixel units in the adjacent columns, and brightness values output by the intermediate sub pixels are equal to zero. A display device and a pixel driving method
(Continued)

are also disclosed. The display panel, the display device and the pixel driving method can reduce a crosstalk caused by the light leakage of the grating, thereby improving a display performance of the display device.

13 Claims, 5 Drawing Sheets

(51) Int. Cl.
  *G09G 5/10* (2006.01)
  *H04N 13/04* (2006.01)
(52) U.S. Cl.
  CPC ..... *H04N 13/0409* (2013.01); *H04N 13/0422* (2013.01); *G09G 2300/0439* (2013.01); *G09G 2300/0452* (2013.01); *G09G 2360/147* (2013.01)
(58) Field of Classification Search
  CPC ....... G09G 2300/0439; H04N 13/0422; H04N 13/0409; H04N 13/0404
  See application file for complete search history.

(56) References Cited

U.S. PATENT DOCUMENTS

| | | | |
|---|---|---|---|
| 9,171,524 | B2 | 10/2015 | Nakahata |
| 9,191,657 | B2 | 11/2015 | Kim et al. |
| 9,325,979 | B2 | 4/2016 | Wu |
| 2010/0220178 | A1 | 9/2010 | Takahashi et al. |
| 2013/0135293 | A1 | 5/2013 | Kim et al. |
| 2014/0098205 | A1 | 4/2014 | Usukura et al. |
| 2015/0319427 | A1 | 11/2015 | Wu |
| 2015/0332640 | A1 | 11/2015 | Liao et al. |
| 2016/0049110 | A1 | 2/2016 | Shi et al. |

FOREIGN PATENT DOCUMENTS

| | | |
|---|---|---|
| CN | 101867836 A | 10/2010 |
| CN | 102253526 A | 11/2011 |
| CN | 102572478 A | 7/2012 |
| CN | 102572479 A | 7/2012 |
| CN | 102628999 A | 8/2012 |
| CN | 102802001 A | 11/2012 |
| CN | 103076704 A | 5/2013 |
| CN | 103152594 A | 6/2013 |
| CN | 103621077 A | 3/2014 |
| CN | 103903524 A | 7/2014 |
| CN | 103913868 A | 7/2014 |
| CN | 104023222 A | 9/2014 |
| CN | 104795012 A | 7/2015 |
| WO | 2012/023492 A1 | 2/2012 |

OTHER PUBLICATIONS

International Search Report and Written Opinion, including English translation of Box No. V, for International Application No. PCT/CN2015/087361, dated Dec. 16 2015, 16 pages.

DISPLAY PANEL, DISPLAY DEVICE AND PIXEL DRIVING METHOD

CROSS-REFERENCE TO RELATED APPLICATION

This application is a Section 371 National Stage Application of International Application No. PCT/CN2015/087361, filed on 18 Aug. 2015, and entitled with "Display Panel, Display Device and Pixel Driving Method", which claims priority to Chinese Patent Application No. 201510154565.X, filed on Apr. 2, 2015 the disclosures of which are incorporated herein by their reference.

BACKGROUND OF THE INVENTION

Field of the Invention

Embodiments of the present disclosure relate to a field of display technology, in particular, to a display panel, a display device and a pixel driving method for three-dimensional (3D) display.

Description of the Related Art

Compared to a flat display device, a 3D display device may display a more stereoscopic and realistic image and obtain a better user experience, so that it is favored by more and more users. A basic principle of 3D display is in that: a left-eye and a right-eye of a viewer accept different images respectively by using a particularly designed display device, then the accepted images are superposed by a brain of the viewer, so as to produce a stereoscopic display image.

Among the 3D display technologies, there is one technology in which a grating is used to perform the 3D display. Specifically, the grating is provided on a display panel, a light transmitting portion and a light shielding portion of the grating are utilized to enable light emitted from pixel units in the display panel corresponding to the light transmitting portion and the light shielding portion enters into the left eye and the right eye, respectively, so as to form a parallax, as a result, a 3D image may be viewed. In such a technology, an ideal situation is in that no light can be transmitted through the light shielding portion of the grating, so that a crosstalk, which otherwise affects the stereoscopic display effect adversely, will not be generated between the left-eye view and the right-eye view. However, in fact, as a result of a limitation of the grating material, the light shielding portion of the grating may have a certain degree of light leakage, so that there is a crosstalk between the left-eye and right-eye views, thereby affecting the stereoscopic display effect adversely. Thus, it is necessary to avoid or reduce the adverse influence on display performance due to the crosstalk.

SUMMARY OF THE INVENTION

Embodiments of the present disclosure provide a display panel, a display device and a pixel driving method for three-dimensional (3D) display, so as to avoid or reduce a crosstalk caused by a light leakage of a grating, thereby improving a display performance of a 3D display device.

According to an aspect of the present disclosure, it is provided a display panel comprising a plurality of pixel units arranged in rows and columns, each of the plurality of pixel units comprising a plurality of sub pixels, wherein the pixel units in adjacent columns are used as left-eye pixel units and right-eye pixel units, respectively, and intermediate sub pixels are provided between the sub pixels of the pixel units in the adjacent columns, and brightness values output by the intermediate sub pixels are equal to zero.

According to an embodiment, the intermediate sub pixels are made of black light-shielding material.

According to an embodiment, each of the pixel units comprises three sub pixels which are arranged in a delta configuration.

According to an embodiment, the sub pixels of all the pixel units in each single column are arranged in the same delta configuration, and the sub pixels of all the pixel units in every two adjacent columns are arranged in a first delta configuration and a second delta configuration respectively, the first delta configuration and the second delta configuration being inverted with regard to each other.

According to an embodiment, the first delta configuration is an inverted delta configuration, and the second delta configuration is an upright delta configuration.

According to another aspect of the present disclosure, it is provided a display device comprising: the display panel according to any one of the above aspect or embodiments; and a grating device configured to enable images displayed in the left-eye pixel units and the right-eye pixel units to enter into a left eye and a right eye respectively.

According to an embodiment, following formulas are satisfied for corresponding sub pixels with the same color in the adjacent left-eye and right-eye pixel units of the display panel:

$$\text{if } L'1>L'2 \text{ and } L'1/L'2 \leq CR, \text{ or if } L'2>L'1 \text{ and } L'2/L'1 \leq CR, \text{ then, } L1'+L2'/CR=L1, \text{ and } L2'+L1'/CR=L2 \quad (1);$$

$$\text{if } L'1>L'2 \text{ and } L'1/L'2>CR, \text{ then } L1'=L1, \text{ and } L2'=L0 \quad (2);$$

$$\text{if } L'2>L'1 \text{ and } L'2/L'1>CR, \text{ then } L2'=L2, \text{ and } L1'=L0 \quad (3);$$

wherein, CR is a reciprocal of the transmittance of a light shielding portion of the grating device, L1 is a preset input brightness value of the sub pixel in the left-eye pixel unit, L2 is a preset input brightness value of the sub pixel in the right-eye pixel unit, L'1 is an output brightness value of the sub pixel in the left-eye pixel unit output through the grating device as a function of the preset input brightness value L1, L'2 is an output brightness value of the sub pixel in the right-eye pixel unit output through the grating device as a function of the preset input brightness value L2, L1' is an adjusted actual input brightness value of the sub pixel in the left-eye pixel unit, L2' is an adjusted actual input brightness value of the sub pixel in the right-eye pixel unit, and L0 indicates a brightness value of zero.

According to a further aspect of the present disclosure, it is provided a pixel driving method for a display device, the display device comprising: a display panel comprising a plurality of pixel units arranged in rows and columns, each of the plurality of pixel units comprising a plurality of sub pixels, the pixel units in adjacent columns being used as left-eye pixel units and right-eye pixel units, respectively; and a grating device configured to enable images displayed in the left-eye pixel units and the right-eye pixel units to enter into a left eye and a right eye respectively;

wherein the method comprises steps of:

determining preset input brightness values to be input into respective sub pixels of the left-eye pixel units and the right-eye pixel units;

adjusting the preset input brightness values to be input into the respective sub pixels of the left-eye pixel units and the right-eye pixel units to obtain actual input brightness values; and inputting the actual input brightness values into the respective sub pixels of the left-eye pixel units and the right-eye pixel units so as to enable actual output brightness values to be close to or equal to the preset input brightness values.

According to an embodiment, the step of adjusting the preset input brightness values to be input into the respective sub pixels of the left-eye pixel units and the right-eye pixel units comprises:

adjusting the preset input brightness values of the corresponding sub pixels with the same color in the adjacent left-eye and right-eye pixel units according to following formulas:

if $L'1>L'2$ and $L'1/L'2 \leq CR$, or if $L'2>L'1$ and $L'2/L'1 \leq CR$, then, $L1'+L2'/CR=L1$, and $L2'+L1'/CR=L2$ (1);

if $L'1>L'2$ and $L'1/L'2>CR$, then $L1'=L1$, and $L2'=L0$ (2);

if $L'2>L'1$ and $L'2/L'1>CR$, then $L2'=L2$, and $L1'=L0$ (3);

wherein, CR is a reciprocal of the transmittance of a light shielding portion of the grating device, L1 is a preset input brightness value of the sub pixel in the left-eye pixel unit, L2 is a preset input brightness value of the sub pixel in the right-eye pixel unit, L'1 is an output brightness value of the sub pixel in the left-eye pixel unit output through the grating device as a function of the preset input brightness value L1, L'2 is an output brightness value of the sub pixel in the right-eye pixel unit output through the grating device as a function of the preset input brightness value L2, L1' is an adjusted actual input brightness value of the sub pixel in the left-eye pixel unit, L2' is an adjusted actual input brightness value of the sub pixel in the right-eye pixel unit, and L0 indicates a brightness value of zero.

According to an embodiment, in the display panel, intermediate sub pixels are provided between the sub pixels of the pixel units in the adjacent columns, and the method further comprises:

setting brightness values output by the intermediate sub pixels to be equal to zero.

According to an embodiment, in the display panel, each of the pixel units comprises three sub pixels which are arranged in a delta configuration.

According to an embodiment, the sub pixels of all the pixel units in each single column are arranged in the same delta configuration, and the sub pixels of all the pixel units in every two adjacent columns are arranged in a first delta configuration and a second delta configuration respectively, the first delta configuration and the second delta configuration being inverted with regard to each other.

According to an embodiment, the first form is an inverted delta configuration, and the second form is an upright delta configuration.

In the display panel according to the embodiments of the present disclosure, the intermediate sub pixels are provided between the sub pixels of the pixel units in the adjacent columns and the brightness values (for example, gray scale) of the intermediate sub pixels are set to be equal to or close to zero. As the left-eye pixel units and the right-eye pixel units are physically spaced apart from each other by the intermediate sub pixels, the crosstalk between the left-eye pixel units and the right-eye pixel units may be avoided even if the light shielding portion of the grating may have a certain degree of light leakage. Thus, the display device according to the embodiments of the present disclosure is capable of improving the stereoscopic display effect.

Moreover, the pixel driving method according to the embodiments of the present disclosure can previously adjust the preset input brightness values of the left-eye and right-eye pixel units if the light shielding portion of the grating has a light leakage, so as to enable the actual output brightness values to be close to or equal to the preset input brightness values. As a result, an adverse influence on the output brightness values of the left-eye and right-eye pixel units by the crosstalk caused by the light leakage of the grating may be reduced, thereby improving the display performance of the display device.

BRIEF DESCRIPTION OF THE DRAWINGS

FIG. 7b is a schematic view showing actual output brightness values generated in a case of the actual input brightness values in FIG. 7a.

DETAILED DESCRIPTION OF PREFERRED EMBODIMENTS OF THE INVENTION

The specific implementations of the present disclosure will be further described in detail in combination with the following embodiments and accompanying drawings. The following embodiments are only used to explain the present disclosure as examples, rather than as limiting the scope of the present invention.

Figure 1:
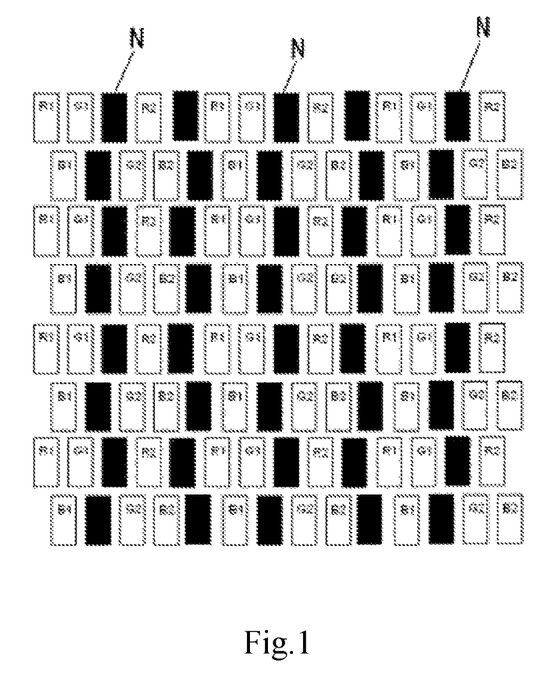
FIG. 1 is a schematic view of a pixel array in a display panel according to an embodiment of the present disclosure.

FIG. 1 is a schematic view of a pixel array in a display panel according to an embodiment of the present disclosure, in which other structures of the display panel are not shown for ease of explanation. As shown in FIG. 1, the display panel comprises a plurality of pixel units arranged in rows and columns, and each of the pixel units consists of three sub pixels including a red sub pixel R, a green sub pixel G and a blue sub pixel B. The pixel units in adjacent columns are used as left-eye pixel units and right-eye pixel units, respectively. For example, in FIG. 1, the pixel units, each of which consists of the red sub pixel R1, the green sub pixel G1 and the blue sub pixel B1, are arranged in a column in a vertical direction as shown in FIG. 1 and are used as the left-eye pixel units to display a left-eye view; and the pixel units, each of which consists of the red sub pixel R2, the green sub pixel G2 and the blue sub pixel B2, are arranged in another column in the vertical direction and are used as the right-eye pixel units to display a right-eye view. Columns of the left-eye pixel units and columns of the right-eye pixel units are alternately arranged with being adjacent to each other. Specifically, in FIG. 1, a first column of pixel units are the left-eye pixel units, a second column of pixel units are the right-eye pixel units, a third column of pixel units are the left-eye pixel units, a fourth column of pixel units are the right-eye pixel units, and so on, thereby forming an entire pixel array.

Moreover, according to the embodiment illustrated in FIG. 1, intermediate sub pixels N are provided between the sub pixels of the pixel units in the adjacent columns, and brightness values output by the intermediate sub pixels N are equal to zero (they are shown as black sub pixels in FIG. 1). Specifically, the intermediate sub pixels N are provided between the green sub pixels G1 of the pixel units in the first column and the red sub pixel R2 of the pixel units in the second column, and the intermediate sub pixels N are further provided between the blue sub pixels B1 of the pixel units in the first column and the green sub pixel G2 of the pixel units in the second column. Similarly, the intermediate sub pixels N are provided between the red sub pixels R2 of the pixel units in the second column and the red sub pixel R1 of the pixel units in the third column, and the intermediate sub pixels N are further provided between the blue sub pixels B2 of the pixel units in the second column and the blue sub pixel B1 of the pixel units in the third column. The intermediate sub pixels N are further provided between the sub pixels of the pixel units in the third column and in the fourth column, between the sub pixels of the pixel units in the fourth column and in the fifth column, and between the sub pixels of the pixel units in other adjacent columns According to the embodiment, as described above, the intermediate sub pixels N are provided between the sub pixels of the pixel units in the adjacent columns, and the brightness values (for example, gray scale) output by the intermediate sub pixels N are equal to or close to zero. The brightness values output by the intermediate sub pixels N are set to be zero, that is, the intermediate sub pixels do not emit light during display, so that the pixel units in the adjacent columns are physically spaced apart from each other by the respective intermediate sub pixels. The pixel units in the adjacent columns are used as the left-eye pixel units and the right-eye pixel units, respectively, so that the left-eye pixel units and the right-eye pixel units are physically spaced apart from each other by the respective intermediate sub pixels, thereby avoiding the crosstalk between the left-eye and right-eye views which otherwise affects a stereoscopic display effect adversely.

According to a particular embodiment, the intermediate sub pixels may be made of black light-shielding material.

Further, according to the embodiment illustrated in FIG. 1, each of the pixel units may comprise three sub pixels including a red sub pixel R, a green sub pixel G and a blue sub pixel B. The three sub pixels are arranged in a form of "品" (also referred to as a delta configuration, i.e. "Δ" shaped configuration). The respective sub pixels of all the pixel units in each single column are arranged in the same form of "品", and the respective sub pixels of the pixel units in every two adjacent columns are arranged in a first form and a second form respectively, and the first form and the second form are the forms of "品" which are inverted with regard to each other (i.e. inverted relative to each other). Specifically, as shown in FIG. 1, in the left-eye pixel units, for example, in the first column of the pixel units, the respective red sub pixels R1, green sub pixels G1 and blue sub pixels B1 of all the pixel units are arranged in the same form of "品". In the right-eye pixel units, for example, in the second column of the pixel units, the respective red sub pixels R2, green sub pixels G2 and blue sub pixels B2 of all the pixel units are arranged in the same another form of "品". More particular, as shown in FIG. 1, the respective sub pixels of all the pixel units in the first column are arranged in an inverted form of "品" (also referred to as an inverted delta configuration, i.e. "∇" shaped configuration), and the respective sub pixels of all the pixel units in the second column are arranged in an upright form of "品" (also referred to as an upright delta configuration, i.e. "Δ" shaped configuration). Such an arrangement may be advantageous for arranging the sub pixels evenly and compactly, thereby increasing a pixel density and thus a resolution. However, it should be understood for those skilled in the art that the concept of the present invention may also be applied to other arrangements of sub pixels.

It should be appreciated that the expression "in a form of "品"" or "in a delta configuration" herein may refer to all forms which may derive from the upright form of "品" or the upright delta configuration as shown in FIG. 1, in other words, it may include the upright form of "品" and the inverted form of "品" as shown in FIG. 1, moreover, though not shown, it may also include other forms of "品", for example, another form of "品" which is rotated by 90° relative to the upright form of "品" or the inverted form of "品".

Moreover, it should be understood for those skilled in the art that a display panel to which the concept of the present invention is applied may comprise various types of display panels, such as liquid crystal display panel, OLED display panel, plasma display panel or the like. The display panel according to the present disclosure may comprise other necessary components, such as an array substrate, a TFT, a color filter substrate, pixel electrodes, gate lines, data lines and so on.

Figure 2:
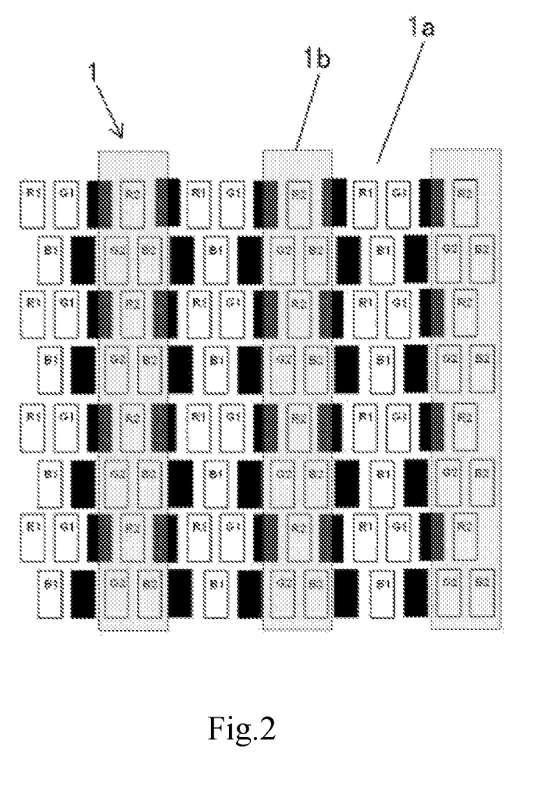
FIG. 2 is a schematic view of the pixel array in FIG. 1 covered with a grating device.

FIG. 2 is a schematic view of the pixel array in FIG. 1 covered with a grating device 1. As shown in FIG. 2, the grating device 1 may comprise a light transmitting portion 1a and a light shielding portion 1b. The light transmitting portion 1a and the light shielding portion 1b correspond to the left-eye pixel unit and the right-eye pixel unit, respectively. In this way, under a light splitting effect of the grating device 1, light emitted from the left-eye pixel unit and the right-eye pixel unit enters into a left eye and a right eye of a viewer respectively, so as to form a left-eye view and a right-eye view and thus produce a stereoscopic view after they are superimposed and fused by the viewer's brain.

The grating device applied in the embodiments of the present disclosure may comprise any known types of gratings, such as a liquid crystal grating, an EC grating (i.e. a grating made of electroluminescent material), a grating barrier and so on. As described above, as a result of a limitation of the grating material, the light shielding portion of the grating may have a certain degree of light leakage, so that there is a crosstalk between the left-eye and right-eye views, thereby affecting the stereoscopic display effect adversely. The embodiments of the present disclosure are capable of reducing or avoiding such crosstalk. Specifically, in the display panel, the intermediate sub pixels are provided between the sub pixels of the pixel units in the adjacent columns (i.e. the left-eye pixel units and the right-eye pixel units) and the brightness values (for example, gray scale) of the intermediate sub pixels are equal to or close to zero. As the left-eye pixel units and the right-eye pixel units are physically spaced apart from each other by the intermediate sub pixels, as shown in FIGS. 1 and 2, the crosstalk between the left-eye pixel units and the right-eye pixel units may be avoided due to the separation of the intermediate sub pixels, even if the light shielding portion 1b of the grating 1 may have a certain degree of light leakage. Thus, the display device according to the embodiment of the present disclosure is capable of improving the stereoscopic display effect.

The pixel array and the grating device of the display device are only schematically illustrated in FIG. 2. It should be understood for those skilled in the art that the display device to which the concept of the present invention is applied may also comprise other additional components besides the display panel and the grating device, such as backlight assembly or the like. Examples of the display device may comprise various devices having display function, such as a desktop computer, a laptop computer, a panel computer, a television, a cellphone, a digital photo frame, a navigator, etc.

An embodiment according to another aspect of the present disclosure may provide a pixel driving method for compensating for the image crosstalk generated in the 3D display device. As described above, as the light shielding portion of the grating has a certain degree of light transmission, the left-eye pixel unit or the right-eye pixel unit shielded by the light shielding portion may also emit light through the grating, so as to generate the crosstalk to the output brightness of the other pixel unit which is not shielded. If an adjustment is not implemented, an actual output brightness value will deviate from a preset brightness value, so that a displayed image would deviate from an ideal image. Thus, it is necessary to adjust the preset input brightness values of the left-eye pixel unit and the right-eye pixel unit previously in order to enable the actual output brightness values to be close to or equal to the preset input brightness values.

To this end, an embodiment of the present disclosure provides a pixel driving method for a display device, for example, as shown in FIG. 2, and the method may comprise steps of:

determining preset input brightness values to be input into respective sub pixels of left-eye pixel units and right-eye pixel units;

adjusting the preset input brightness values to be input into the respective sub pixels of left-eye pixel units and right-eye pixel units to obtain actual input brightness values; and inputting the actual input brightness values into the respective sub pixels of the left-eye pixel units and the right-eye pixel units so as to enable actual output brightness values to be close to or equal to the preset input brightness values.

Figure 3A:
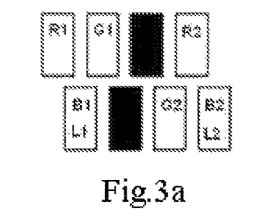
FIGS. 3a and 3b are schematic views showing an input brightness value and an output brightness value in two adjacent left-eye and right-eye pixel units in the pixel array in FIG. 1.
Figure 3B:
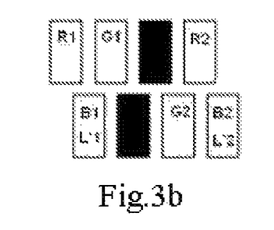

For example, FIGS. 3a and 3b are schematic views showing the input brightness value and the output brightness value in two adjacent left-eye and the right-eye pixel units in the pixel array in FIG. 1. Taking the blue sub pixel as an example, in FIG. 3a, the preset input brightness value of the blue sub pixel in the left-eye pixel unit is equal to L1, and the preset input brightness value of the blue sub pixel in the right-eye pixel unit is equal to L2; in FIG. 3b, the output brightness value of the blue sub pixel in the left-eye pixel unit output through the grating device as a function of the preset input brightness value L1 is equal to L'1, and the output brightness value of the blue sub pixel in the right-eye pixel unit output through the grating device as a function of the preset input brightness value L2 is equal to L'2. A reciprocal of the transmittance of the grating material is assumed to be CR.

As shown in FIGS. 3a and 3b, taking the blue sub pixel as an example, according to an embodiment, the actual input brightness value L1' of the blue sub pixel in the left-eye pixel unit and the actual input brightness value L2' of the blue sub pixel in the right-eye pixel unit are calculated according to the following formulas:

$$\text{if } L'1 > L'2 \text{ and } L'1/L'2 \leq CR, \text{ or if } L'2 > L'1 \text{ and } L'2/L'1 \leq CR, \text{ then, } L1' + L2'/CR = L1, \text{ and } L2' + L1'/CR = L2 \quad (1);$$

$$\text{if } L'1 > L'2 \text{ and } L'1/L'2 > CR, \text{ then } L1' = L1, \text{ and } L2' = L0 \quad (2);$$

$$\text{if } L'2 > L'1 \text{ and } L'2/L'1 > CR, \text{ then } L2' = L2, \text{ and } L1' = L0 \quad (3).$$

where L0 indicates that the output brightness value is equal to zero. The values of CR are varied depending on the grating material, typically, the values of CR may be within a range of from 5 to 100.

The specific processes for determining the actual input brightness value L1' of the blue sub pixel in the left-eye pixel unit and the actual input brightness value L2' of the blue sub pixel in the right-eye pixel unit according to the above formulas will be described hereinafter.

The specific processes for determining the actual input brightness values L1' and L2' may comprise steps of:

determining a ratio value L'1/L'2 of the output brightness value L'1 of the left-eye pixel unit output through the grating as a function of the preset input brightness value L1 to the output brightness value L'2 of the right-eye pixel unit output through the grating as a function of the preset input brightness value L2 when L'1>L'2, alternatively, determining a ratio value L'2/L'1 of the output brightness value L'2 of the right-eye pixel unit output through the grating as a function of the preset input brightness value L2 to the output brightness value L'1 of the left-eye pixel unit output through the grating as a function of the preset input brightness value L1 when L'2>L'1;

comparing the ratio value L'1/L'2 or L'2/L'1 with the reciprocal CR of the transmittance of the grating material;

determining the actual input brightness values L1' and L2' according to a result of the comparison, specifically, calculating the actual input brightness values L1' and L2' by using the formula (1) when the ratio value L'1/L'2 or L'2/L'1 is no more than the reciprocal CR; alternatively, calculating the actual input brightness values L1' and L2' by using the formula (2) when the ratio value L'1/L'2 is larger than the reciprocal CR; or alternatively, calculating the actual input brightness values L1' and L2' by using the formula (3) when the ratio value L'2/L'1 is larger than the reciprocal CR.

The pixel driving method according to the present disclosure has been explained by taking the blue sub pixel as an example, and it may also be applied to the red sub pixel and the green sub pixel. Moreover, the pixel driving method according to the present disclosure has been explained by taking the pixel array as shown in FIGS. 1 and 2 as an example, however, it may also be applied to any other pixel arrays in which pixel units in adjacent columns are divided into the left-eye pixel units and the right-eye pixel units.

The above adjusting method will be described by the following specific example with reference to FIGS. 4 to 7.

Figure 4:
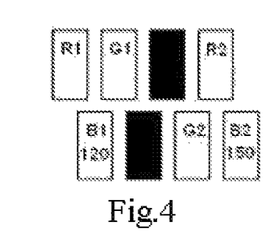
FIG. 4 is a schematic view showing an example of preset input brightness values of the left-eye and right-eye pixel units in FIG. 3.

FIG. 4 is a schematic view showing an example of the preset input brightness values of the left-eye and right-eye pixel units in FIG. 3. As shown in FIG. 4, by taking the blue sub pixel as an example, the preset input brightness value L1 of the left-eye pixel unit is equal to 120, and the preset input brightness value L2 of the right-eye pixel unit is equal to 150.

Figure 5A:
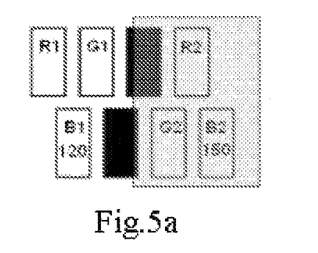
FIGS. 5a and 5b are schematic views showing that the output brightness value of the right-eye pixel unit in FIG. 4 output through the grating is varied.
Figure 5B:
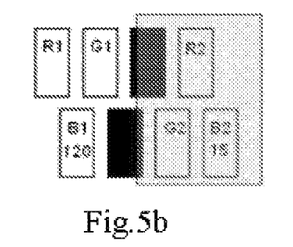

FIGS. 5a and 5b are schematic views showing that the output brightness value of the right-eye pixel unit output through the grating in FIG. 4 is varied. As shown in FIG. 5a, the grating device is provided on the pixel units in FIG. 4, and the light shielding portion of the grating corresponds to the right-eye pixel unit. Provided that the transmittance of the light shielding portion of the grating is equal to 10%, then CR will be equal to 10. In this case, as a result of the grating, the output brightness value L'1 of the left-eye pixel unit is kept unchanged to be equal to the input brightness value, that is, L'1=120, and the output brightness value L'2 of the right-eye pixel unit is changed into 10% of the preset input brightness value L2, that is, L'2=15, as shown in FIG. 5b.

Figure 6A:
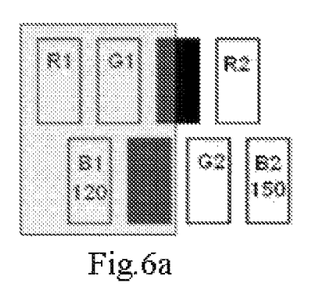
FIGS. 6a and 6b are schematic views showing that the output brightness value of the left-eye pixel unit in FIG. 4 output through the grating is varied.
Figure 6B:
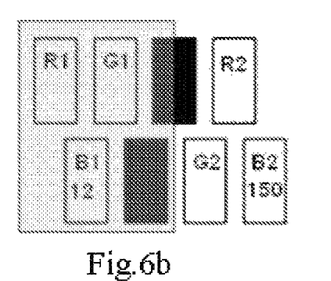

FIGS. 6a and 6b are schematic views showing that the output brightness value of the left-eye pixel unit output through the grating in FIG. 4 is varied. As shown in FIG. 6a, the grating device is provided on the pixel units in FIG. 4, and the light shielding portion of the grating corresponds to the left-eye pixel unit. Provided that the transmittance of the light shielding portion of the grating is equal to 10%, then CR will be equal to 10. In this case, as a result of the grating, the output brightness value L'1 of the left-eye pixel unit is changed into 10% of the preset input brightness value L1, that is, L'1=12, and the output brightness value L'2 of the right-eye pixel unit is kept unchanged to be equal to the input brightness value, that is, L'2=150, as shown in FIG. 6b.

Figure 7A:
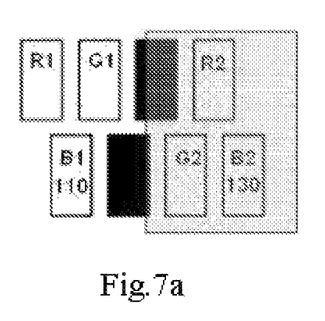
FIG. 7a is a schematic view showing actual input brightness values obtained by adjusting the preset input brightness values of the left-eye and right-eye pixel units in FIG. 5 by using the pixel driving method according to an embodiment of the present disclosure.

FIG. 7a is a schematic view showing the actual input brightness values obtained by adjusting the preset input brightness values of the left-eye and right-eye pixel units in FIG. 5 by using the pixel driving method according to the embodiment of the present disclosure. Specifically, as shown in FIG. 7a, the light shielding portion of the grating corresponds to the right-eye pixel unit. Provided that the transmittance of the light shielding portion of the grating is equal to 10%, then CR will be equal to 10. The output brightness values L'1, L'2 output through the grating will be equal to 120, 15 respectively when the preset brightness values L1, L2 are equal to 120, 150 respectively. In this case, if the input brightness value is not adjusted, a final output brightness value obtained by adding the output brightness values L'1 and L'2 of the blue sub pixels output through the grating is definitely larger than the preset input brightness value (i.e. 120), thus an anticipated display effect cannot be produced.

Instead, according to the pixel driving method of the present disclosure, in the case that the input brightness values L1, L2 are equal to 120, 150, respectively, L'1/L'2=120/15=8, that is, a ratio value of L'1/L'2 is less than CR, so that it is required to determine the actual input brightness values L1', L2' of the left-eye and right-eye pixel units according to the formula (1). Then, L1=120, L2=150 and CR=10 are respectively substituted into the formula (1), after calculating the formula, it can be obtained that L1'≈106, L2'≈139. Thus, ideally, the input brightness value of the blue sub pixel of the left-eye pixel unit is to be adjusted into about 106, and the input brightness value of the blue sub pixel of the right-eye pixel unit is to be adjusted into about 139. In this way, the final output brightness value obtained by adding the output brightness values of the blue sub pixels of the left-eye and right-eye pixel units will be expressed as: 106+139/10≈120. In other words, the final output brightness value is close to the preset input brightness value of the blue sub pixel of the left-eye pixel unit. Thus, by using the pixel driving method according to the embodiment of the present disclosure, the deviation of the output brightness value of the blue sub pixel from the preset input brightness value due to the crosstalk caused by the light leakage of the grating can be prevented.

Figure 7B:
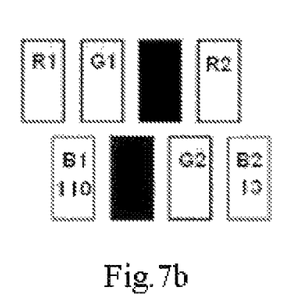

During actual adjustment, the actual input brightness values are only required to be close to the above calculated values. For example, as shown in FIG. 7a, the actual input brightness value L1' of the left-eye pixel unit may be equal to 110, and the actual input brightness value L2' of the right-eye pixel unit may be equal to 130. As a result, as shown in FIG. 7b, through the grating device, the actual output brightness value of the left-eye pixel unit may be equal to 110, and the actual output brightness value of the right-eye pixel unit may be equal to 13. Thus, the final output brightness value obtained by adding the output brightness values of the blue sub pixels of the left-eye and right-eye pixel units can be expressed as: 110+13=123. It can be seen that the final output brightness value is close to the preset input brightness value (equal to 120) of the blue sub pixel of the left-eye pixel unit. In this way, the deviation of the output brightness value of the blue sub pixel from the preset input brightness value due to the crosstalk caused by the light leakage of the grating can also be prevented.

Moreover, in the case as shown in FIG. 6, it can be determined that L'2/L'1=150/12=12.5, that is, L'2/L'1>CR. In this case, it is required to determine the actual input brightness values L1', L2' of the left-eye and right-eye pixel units according to the formula (3). Specifically, according to the formula (3), it can be obtained that the actual input brightness value L1' of the blue sub pixel of the left-eye pixel unit is equal to be 0 and the actual input brightness value L2' of the blue sub pixel of the right-eye pixel unit is equal to be 150.

In the above examples, the transmittance of the grating material is assumed to be 10%, so that the CR is equal to 10. In fact, the transmittance of the grating material is not constant, so that the CR may be varied within a certain range. Typically, the CR is within a range of from 5 to 100.

The examples for adjusting the preset input brightness values of the respective sub pixels of the left-eye and right-eye pixel units have been described, however, those skilled in the art can envisage any other manners to adjust the preset input brightness values, as long as these manners enable the adjusted actual output brightness values to be close to or equal to the preset input brightness values.

As described above, the pixel driving method according to the embodiments of the present disclosure is capable of reducing the influence of the crosstalk caused by the light leakage of the grating if the light leakage is generated when the grating is in use, thereby improving the display performance of the display device.

The above implementations are merely used to explain the present invention, rather than to limit the present invention. Various changes and modifications may be made by those skilled in the art without departing from the spirit and scope of the present invention. Thus, all the equivalent technical solutions also fall into the scope of the present invention, which should be defined by appended claims.

What is claimed is:

1. A display device comprising:
a display panel, comprising:
    a plurality of pixel units arranged in rows and columns, each of the plurality of pixel units comprising a plurality of sub pixels, wherein, the pixel units in adjacent columns are used as left-eye pixel units and right-eye pixel units, respectively, and
    intermediate sub pixels are provided between the sub pixels of the pixel units in the adjacent columns, and brightness values output by the intermediate sub pixels are equal to zero; and
a grating device configured to enable images displayed in the left-eye pixel units and the right-eye pixel units to enter into a left eye and a right eye respectively, wherein, following formulas are satisfied for corresponding sub pixels with the same color in the adjacent left-eye and right-eye pixel units of the display panel:

if $L'1>L'2$ and $L'1/L'2 \leq CR$, or if $L'2>L'1$ and $L'2/L'1 \leq CR$, then, $L1'+L2'/CR=L1$, and $L2'+L1'/CR=L2$    (1);

if $L'1>L'2$ and $L'1/L'2>CR$, then $L1'=L1$, and $L2'=L0$    (2);

if $L'2>L'1$ and $L'2/L'1>CR$, then $L2'=L2$, and $L1'=L0$    (3);

wherein, CR is a reciprocal of the transmittance of a light shield portion of the grating device, L1 is a present input brightness value of the sub pixel in the left-eye pixel unit, L2 is a preset input brightness value of the sub pixel in the right-eye pixel unit, L'1 is an output brightness value of the sub pixel in the left-eye pixel unit output through the grating device as a function of the preset input brightness value L1, L'2 is an output brightness value of the sub pixel in the right-eye pixel unit output through the grating device as a function of the preset input brightness value L2, L1' is an adjusted actual input brightness value of the sub pixel in the left-eye pixel unit, L2' is an adjusted actual input brightness value of the sub pixel in the right-eye pixel unit, and L0 indicates a brightness value of zero.

2. A pixel driving method for a display device, the display device comprising: a display panel comprising a plurality of pixel units arranged in rows and columns, each of the plurality of pixel units comprising a plurality of sub pixels, the pixel units in adjacent columns being used as left-eye pixel units and right-eye pixel units, respectively; and a grating device configured to enable images displayed in the left-eye pixel units and the right-eye pixel units to enter into a left eye and a right eye respectively;

wherein the method comprises steps of:

determining preset input brightness values to be input into respective sub pixels of the left-eye pixel units and the right-eye pixel units;

adjusting the preset input brightness values to be input into the respective sub pixels of the left-eye pixel units and the right-eye pixel units to obtain actual input brightness values; and inputting the actual input brightness values into the respective sub pixels of the left-eye pixel units and the right-eye pixel units so as to enable actual output brightness values to be close to or equal to the preset input brightness values;

wherein, the step of adjusting the preset input brightness values to be input into the respective sub pixels of the left-eye pixel units and the right-eye pixel units comprises:

adjusting the preset input brightness values of the corresponding sub pixels with the same color in the adjacent left-eye and right-eye pixel units according to following formulas, to obtain actual input brightness value:

if $L'1>L'2$ and $L'1/L'2 \leq CR$, or if $L'2>L'1$ and $L'2/L'1 \leq CR$, then, $L1'+L2'/CR=L1$, and $L2'+L1'/CR=L2$    (1);

if $L'1>L'2$ and $L'1/L'2>CR$, then $L1'=L1$, and $L2'=L0$    (2);

if $L'2>L'1$ and $L'2/L'1>CR$, then $L2'=L2$, and $L1'=L0$    (3);

wherein, CR is a reciprocal of the transmittance of a light shielding portion of the grating device, L1 is a preset input brightness value of the sub pixel in the left-eye pixel unit, L2 is a preset input brightness value of the sub pixel in the right-eye pixel unit, L'1 is an output brightness value of the sub pixel in the left-eye pixel unit output through the grating device as a function of the preset input brightness value L1, L'2 is an output brightness value of the sub pixel in the right-eye pixel unit output through the grating device as a function of the preset input brightness value L2, L1' is an adjusted actual input brightness value of the sub pixel in the left-eye pixel unit, L2' is an adjusted actual input brightness value of the sub pixel in the right-eye pixel unit, and L0 indicates a brightness value of zero.

3. The pixel driving method according to claim 2, wherein, in the display panel, intermediate sub pixels are provided between the sub pixels of the pixel units in the adjacent columns, and the method further comprises:

setting brightness values output by the intermediate sub pixels to be equal to zero.

4. The pixel driving method according to claim 2, wherein, in the display panel, each of the pixel units comprises three sub pixels which are arranged in a delta configuration.

5. The pixel driving method according to claim 4, wherein, the sub pixels of all the pixel units in each single column are arranged in the same delta configuration, and the sub pixels of all the pixel units in every two adjacent columns are arranged in a first delta configuration and a second delta configuration respectively, the first delta configuration and the second delta configuration being inverted with regard to each other.

6. The pixel driving method according to claim 5, wherein, the first delta configuration is an inverted delta configuration, and the second delta configuration is an upright delta configuration.

7. The pixel driving method according to claim 2, wherein, in the display panel, intermediate sub pixels are provided between the sub pixels of the pixel units in the adjacent columns, and the method further comprises: setting brightness values output by the intermediate sub pixels to be equal to zero.

8. The pixel driving method according to claim 2, wherein, in the display panel, each of the pixel units comprises three sub pixels which are arranged in a delta configuration.

9. The pixel driving method according to claim 3, wherein, in the display panel, each of the pixel units comprises three sub pixels which are arranged in a delta configuration.

10. The display device according to claim 1, wherein the intermediate sub pixels are made of black light-shielding material.

11. The display device according to claim 10, wherein each of the pixel units comprises three sub pixels which are arranged in a delta configuration.

12. The display device according to claim 11, wherein, the sub pixels of all the pixel units in each single column are arranged in the same delta configuration, and the sub pixels of all the pixel units in every two adjacent columns are arranged in a first delta configuration and a second delta configuration respectively, the first delta configuration and the delta configuration being inverted with regard to each other.

13. The display device according to claim 12, wherein, the first delta configuration is an inverted delta configuration, and the second delta configuration is an upright delta configuration.

\* \* \* \* \*